United States Patent [19]

MacDonald

[11] 4,421,407

[45] Dec. 20, 1983

[54] IMAGE COMBINING SEXTANT OR THE LIKE

[75] Inventor: Angus MacDonald, Oakland, Calif.

[73] Assignee: Davis Instruments, San Leandro, Calif.

[21] Appl. No.: 256,464

[22] Filed: Apr. 22, 1981

Related U.S. Application Data

[63] Continuation of Ser. No. 75,869, Sep. 17, 1979, abandoned.

[51] Int. Cl.³ .............................................. G01C 1/08
[52] U.S. Cl. ...................................... 356/144; 356/10
[58] Field of Search ............................... 356/140–149, 356/10, 253–255, 138; 350/172, 171, 166; 33/268, 376–280; 250/203 R

[56] References Cited

U.S. PATENT DOCUMENTS

| 2,373,249 | 4/1945 | Lurcott, Jr. | 356/10 |
| 2,994,245 | 8/1961 | Wagner | 356/145 |
| 3,352,196 | 11/1967 | Hammond, Jr. | 356/254 |
| 3,641,347 | 2/1972 | Kubo et al. | 250/203 R |
| 3,752,591 | 8/1973 | Feldman | 356/253 |

FOREIGN PATENT DOCUMENTS 719151 11/1954 United Kingdom ................ 356/140

OTHER PUBLICATIONS

Brainard; F. R., "The Sextant & Other Reflecting Mathematical Instruments," D. Van Nostrand Co., 1891, pp. 71–73, VK583B8.

Primary Examiner—William H. Punter
Attorney, Agent, or Firm—Townsend and Townsend

[57] ABSTRACT

An improved optical measuring instrument having an image combining mirror which reflects part of the light from one source and transmits part of the light from another source and superimposes such reflected and transmitted light over the entire surface of the mirror is disclosed. In the preferred embodiment an improved sextant is disclosed using the image combining mirror. Sextants are double reflecting optical devices which are generally used to measure the angle between a celestial object, such as the sun, the moon, or a star, and the horizon. This measurement is used primarily in navigation for determining the user's location at sea. Prior sextants split the viewing area of the horizon mirror into two fields of view: one-half horizon and one-half celestial object. The improved sextant uses a horizon mirror which combines and overlaps (superimposes) the horizon and celestial images over the entire viewing area. This is preferably accomplished by the use of a spectrally selective dielectric beamsplitter as the horizon mirror, such mirror mainly transmitting light in one spectral region and substantially reflecting light in another spectral region. The result is a horizon mirror which both splits and converges the horizon and celestial images resulting in an enlarged field of view of both the horizon and the celestial object.

8 Claims, 6 Drawing Figures

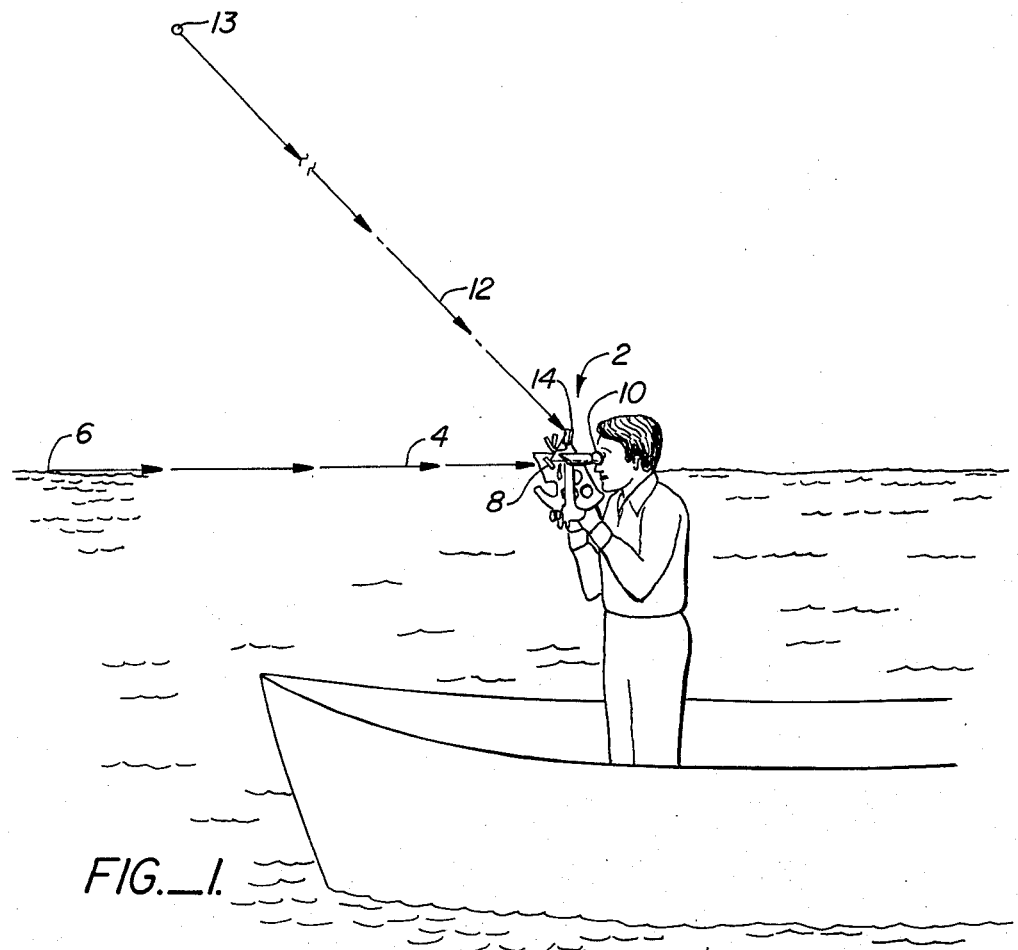
FIG._1.
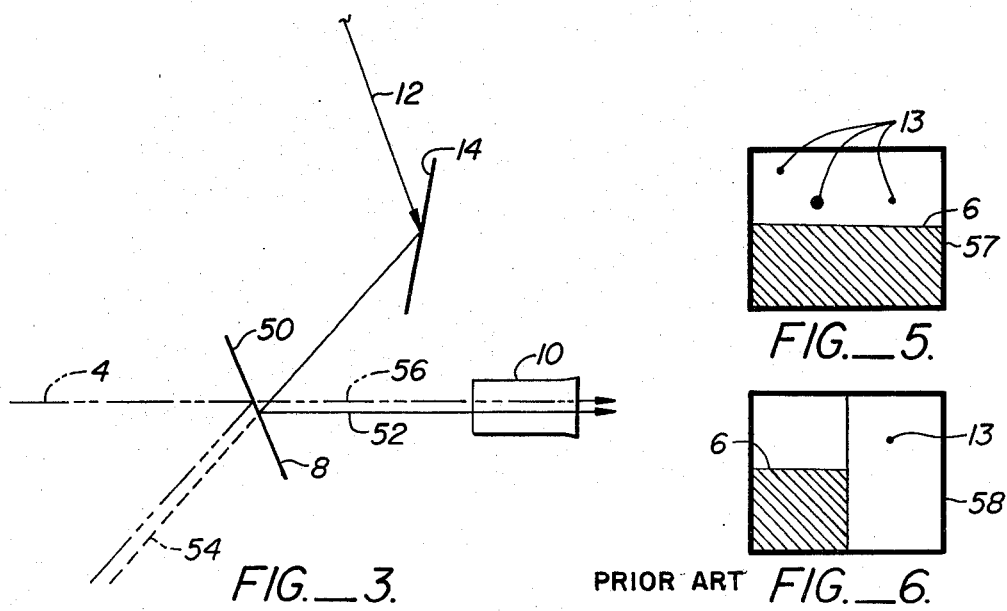
FIG._3.   PRIOR ART   FIG._6.

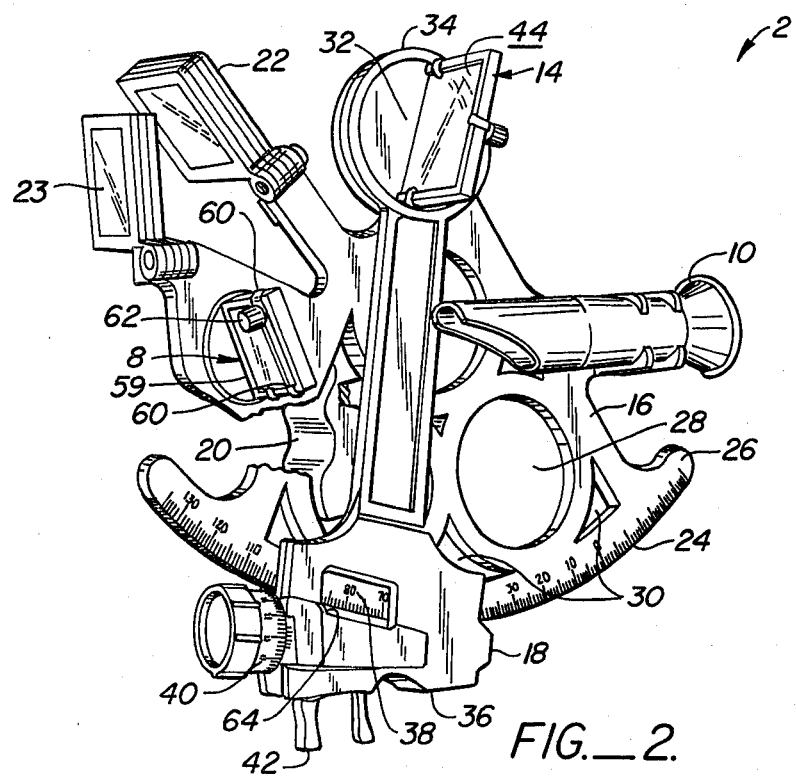
FIG._2.
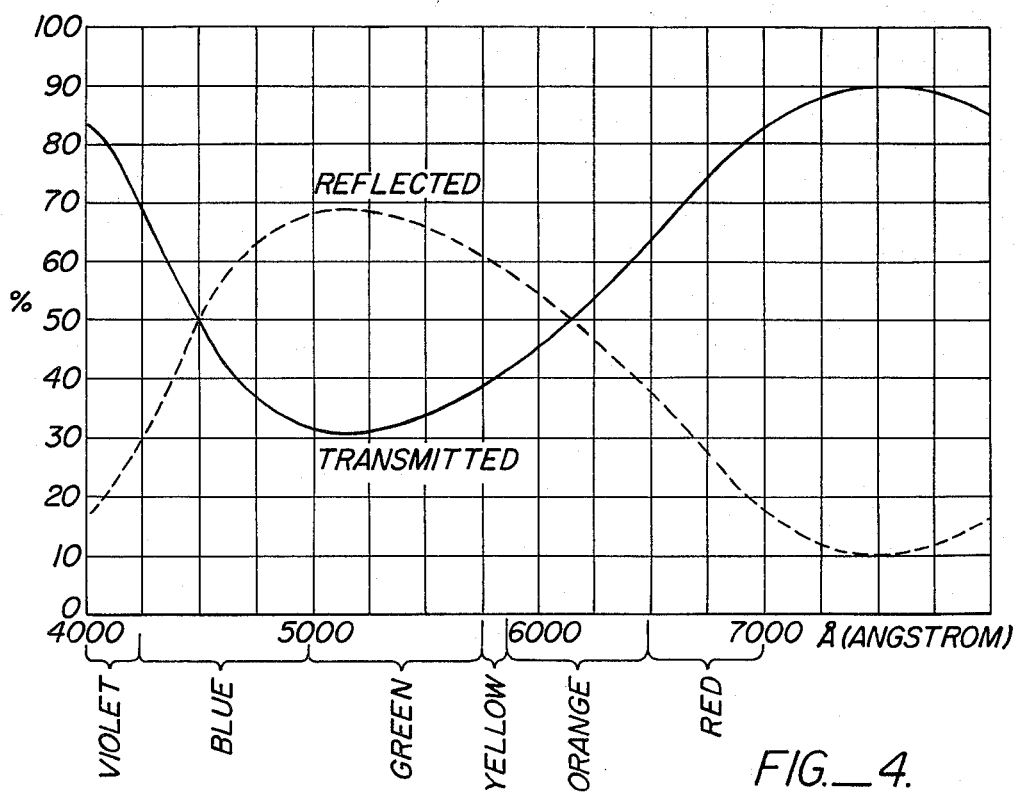
FIG._4.

IMAGE COMBINING SEXTANT OR THE LIKE

This is a continuation of application Ser. No. 75,869, filed Sept. 17, 1979 and now abandoned.

This invention relates to optical instruments which measure the angle between two light sources, such as stadimeters or sextants, more particularly to a sextant having a horizon mirror which provides the user with a superimposed, combined image of the horizon and the celestial object fixed upon.

DESCRIPTION OF THE PRIOR ART

Sextants are double-reflecting optical measuring instruments that are usually used to measure the angle of a celestial object, such as the sun or moon or Polaris (the North Star), above the horizon. This measurement allows one to approximate his location on the earth's surface and thus has widespread utility in navigation. Sextants have two mirrors. One mirror, called an index mirror, reflects the light from the celestial object to a second mirror, called the horizon mirror. From the horizon mirror this celestial object image is reflected through an eyepiece to the user. The horizon mirror has two functions. It reflects the light from the index mirror. It also alows light to pass through it directly to the eyepiece for viewing by the user. In prior art sextants the horizon mirror is clear on one side (so to see the horizon) and silvered on the other (to reflect the light from the index mirror). So what is called the horizon mirror in prior art is really only half of a mirror or a semi-mirror. Filters, called shades, are used when viewing a bright object, such as the sun, and can also be used to give a clearer more distinct view of the horizon on a hazy evening.

To use a standard sextant, one looks through the eyepiece through the clear half of the horizon mirror at the horizon. An index arm, on which is mounted the index mirror, is pivoted until the celestial object comes within sight on the silvered side of the horizon mirror. The sextant is then rocked slowly back and forth. This is called "swinging the arc." This rocking is done to insure the sextant is held vertically. As the sextant is rocked, the celestial object will travel in a short arc along the horizon mirror. The index arm is slowly adjusted until the image of the celestial object just touches, at the lowest point during its arcuate swing, the horizon. When it does so, the celestial object's altitude (the angle between the horizon and the celestial object in reference to the user's position on the surface of the earth) is read from the index scale on the sextant. Of course there are corrections to be made and refinements in the use of the sextant, but the above outlines the essential operation of a standard sextant.

A major disadvantage with the prior art sextants is the use of a semi-mirror for the horizon mirror. In it half the field of view is completely horizon image and half is celestial image. (When viewing a very bright object, such as the sun, some reflection back from the clear half of the semi-mirror occurs. This reflection will not occur for most other heavenly bodies, such as second magnitude stars like Polaris.) With only half the viewing area devoted to the celestial image, it is very easy to lose a celestial object, especially a weak star, from the viewing area. This is especially true when using the sextant from the deck of a pitching, rolling, or yawing ship as is often the case. When swinging the arc it is often very difficult to tell when the celestial object just touches the horizon. For each minute of arc the reading is off, the computed latitude will be off by one nautical mile. It is therefore very important that the sighting be as accurate as possible.

Another problem which occurs when using a sextant at sea results from the fixing on a false horizon. This can occur, for example, when the user takes a sight while in the trough of a long ocean wave. The perceived horizon will actually be much higher than the actual horizon. A large error in position can result.

Often the horizon, especially at dawn and dusk, is fuzzy or indistinct due to haze. Because of this the location of the true horizon is often quite difficult. These errors in measurement can have obvious dire consequences for someone out in the middle of an ocean.

The above problems associated with the prior art sextants were well known. However, they have proved to be invaluable in navigation and are still used throughout the world.

SUMMARY OF THE INVENTION

An improved sextant which solves the problems associated with prior art horizon mirrors is disclosed. The improved sextant uses a horizon mirror which combines and overlaps (superimposes) the horizon and celestial images into the entire viewing area. This is preferably accomplished by using a spectrally selective dielectric beamsplitter as the horizon mirror, such mirror mainly transmitting light in one spectral region and substantially reflecting the light in another spectral region. The result is a horizon mirror which both splits and converges the horizon and celestial images resulting in an enlarged field of view of both the horizon and the celestial object.

Most optical devices transmit some light, reflect some light and absorb some light. Beamsplitters are optical devices which transmit some light, absorb a small amount (which generally can be ignored), and reflect the rest. Some types of beamsplitters are spectrally neutral: the fraction reflected or transmitted does not depend upon the wavelength (or color) of the light. Others are spectrally selective; that is, the fraction they reflect and the fraction they transmit may vary with the color of the light. Dielectric beamsplitters are beamsplitters which are typically made by vacuum depositing layers of dielectric material onto a glass substrate. The spectral reflective and transmissive properties of dielectric beamsplitters are determined by the thickness of the layers, the number of the layers and the type of material deposited.

Usually beamsplitters, such as a dielectric beamsplitter, are used as their name suggests—to split a beam of light into a reflective portion and a transmitted portion. The present invention uses them in a new and unobvious way to provide the celestial-guided navigator a much improved instrument. The invention uses the same optical element to transmit light from one source (e.g. the horizon) through the element to be viewed by the user; at the same time the element reflects light from another source (e.g. a celestial body) off of the surface of the element to the user. The beamsplitter actually acts as a beam converger or image superimposer. The beamsplitter may be chosen to be spectrally selective, thereby emphasizing some sources of light while deemphasizing other sources.

An object of the invention is to provide the user with a horizon mirror in which the horizon image and the celestial body image are superimposed over the entire viewing area.

Many advantages result from providing the user with a larger viewing area for both the horizon and the celestial body images. It is generally easier and quicker to align the horizon and celestial object when the celestial object can be seen over the entire viewing area. It is especially helpful in viewing small, weak stars which are difficult to pick up.

The larger viewing area also makes using the sextant much easier when standing on the deck of a relatively unstable boat or ship. The images may shift from one side to the other, but would not be lost as with a prior art sextant.

Incorrect sightings taken while the vessel is in the trough of a long wave can be more easily prevented with a larger viewing area. Because the width of the horizon viewed is generally doubled using the invention, wave watching is made much easier. Fewer erroneous readings result.

When the horizon is indistinct, as often occurs at dusk or dawn, determining the exact location of the horizon is difficult. Using the present invention the length of the horizon is generally doubled. This doubled horizon length allows the user to better estimate where the earth ends and where the sky begins—the horizon.

Another object of this invention is to use a dielectric beamsplitter as the horizon mirror. The dielectric beamsplitter can be chosen, when desired, to be spectrally selective so that one range of colors is mainly transmitted and another range of colors is mainly reflected. Alternatively, the dielectric beam splitter can be maintained spectrally neutral.

This use of one such spectrally selective horizon mirror allows the generally blue to yellow light from most stars, including the sun (and the reflected light from the moon), to be reflected off the horizon mirror to the user and also allows the orange to red wavelengths so often found at sunset and sunrise to be transmitted through the horizon mirror to the user. This feature keeps the two images from washing out the other. Other spectrally selective beamsplitters can be used for special lighting circumstances—for example under a pre-dawn haze.

In addition to the ability to be spectrally selective, dielectric beamsplitters are very resistant to corrosion from salt-water—about as resistant as glass itself. This is a great advantage over the standard silvered semi-mirror used in prior art sextants. The invention has further use in rangefinders, particularly of the stadimetric variety.

This invention also allows existing sextants to be modified to incorporate the image superimposing, spectrally selective, dielectric beamsplitter as its horizon mirror. The advantages for the present invention would likewise accrue to a modified sextant.

Additional objects and features of the invention will appear from the following description in which preferred embodiment has been set forth in detail in conjunction with the accompanying drawings.

BRIEF DESCRIPTION OF THE DRAWINGS

FIG. 1 is a view of a person on the deck of a ship using a sextant to determine the altitude of a celestial object above the horizon.

FIG. 2 is a perspective view of the image combining sextant.

FIG. 3 is a diagram of the optical paths and elements of the invention showing the reflected and transmitted paths of the horizon image and celestial object image.

FIG. 4 is a diagram of the spectral transmission and reflection characteristics of a preferred dielectric beamsplitter.

FIG. 5 is a simulated image showing the horizon and celestial images superimposed.

FIG. 6 is a simulated image showing the same view as in FIG. 5 but as seen through a standard horizon mirror so that the horizon and celestial images are not superimposed.

DETAILED DESCRIPTION OF THE PREFERRED EMBODIMENT

In FIG. 1 a user is shown standing on the deck of a sail boat using an image combining sextant 2. The user is shown viewing a horizon image 4, emanating from a horizon 6 after it has passed through an image combining horizon mirror 8, and then through an eyepiece 10. A celestial body image 12 is shown emanating from a celestial body 13. Celestial body image 12 is reflected off of an index mirror 14, then off of horizon mirror 8 where it also passes through eyepiece 10 to the user.

First, the working components of the image combining sextant 2 will be described. Next, the operation of the image combining horizon mirror 8 will be addressed. Then, the use of sextant 2, concentrating on the full-view, superimposed horizon/celestial object images will be described.

FIG. 2 is a perspective view of sextant 2. Sextant 2 comprises generally a body 16, an index arm 18, index mirror 14, horizon mirror 8, a handle 20, eyepiece 10, and a number of index shades 22 and horizon shades 23.

Body 16 is a generally planar, pie-shaped structure having an index scale 24 marked along its arcuate outer edge 26. Body 16 has a first side and a second side and defines a number of circular 28 and triangular-shaped voids 30 through its generally planar surface. A pivot point 32 is located on body 16 opposite outer edge 26.

At point 32 index arm 18 is pivotally mounted on the first side of body 16 and moves in a plane adjacent to and parallel to the plane defined by the generally planar surface of body 16, thereinafter body plane. Arm 18 is an elongate member having a pivot end 34, pivotally attached at point 32, and an index end 36. Index end 36 is configured to surround outer edge 26 so that as index arm 18 pivots about point 32, the angular position between horizon 6 and celestial body 13 can be read from index scale 24 through a recangular aperture 38 defined within index end 36 of arm 18. End 36 has means for controllably moving arm 18 about point 32. In the preferred embodiment spiral grooves formed on one end of a calibrated micrometer drum 40 rotatably engages the serrated arcuate outer edge 26 of body 16. This allows for precise, minute movement of arm 18. Index end 36 also has a quick release lever 42 which can be depressed to disengage the spirally grooved portion of drum 40 from outer edge 26, thus allowing for rapid movement of arm 18.

Attached to body 16 on the second side of body 16 is handle 20. Handle 20 is typically used to hold sextant 2 in user's right hand while pivotal movement of arm 18 is performed with user's left hand.

Horizon mirror 8 is mounted to body 16 on the first side of body 16 near one end of outer edge 26. Eyepiece 10 is mounted on the first side of body 16 near the other end of outer edge 26 and is in visual alignment with horizon mirror 8. The axis of eyepiece 10 is parallel to the body plane. Horizon mirror 8 is mounted so that its surface lies in a plane which is nomal to the body plane.

Index mirror 14 is mounted to index arm 18 at a point medially over pivot point 32 at pivot end 34 so that a reflective surface 44 of index mirror 14 is positioned normal to body plane. The centers of mirrors 8 and 14 and the central axis of eyepiece 10 are aproximately the same distance from the body plane.

Index shades 22 are optical filters pivotally mounted on body 16 to be selectively rotated into position between and index mirror 14 and horizon mirror 8. Horizon shades 23 are also optical filters pivotally mounted to body 16 which can be selectively placed between horizon 6 and horizon mirror 8. These shades can be used to reduce the amount of light to the user, as when using the sun as the celestial object.

The dielectric beamsplitter chosen (which acts as both a beamsplitter and a beam combiner) in the preferred embodiment has a number of desirable qualities. The transmission and reflection relationships of the dielectric beamsplitter used as horizon mirror 8 in the preferred embodiment are shown at FIG. 3. It transmits light in the orange-red range—such being the same range as emanates from the horizon at dusk and dawn when so many star shots are taken. It reflects light in the blue-green-yellow range; such range includes the dominant wavelengths of light emitted from most celestial objects. It also transmits light in the violet-blue range, as shown in FIG. 4. Therefore, the spectrally selective beamsplitter, used in this unusual manner involving transmission from one side and reflection from the other, can be of great advantage, especially for dawn and dusk use. Other optical elements, such as partially metalized mirrors, which combine total field viewing by superimposing celestial body and horizon images 12,4 by reflection and transmission, even if they are not spectrally selective, can be used and are within the scope of this invention.

FIG. 3 represents the paths of the horizon and celestial body images 4, 12. Image 12 is reflected from index mirror 14 substantially unchanged. When image 12 strikes the rearward face 50 (the surface toward the user) of horizon mirror 8, part of the light energy is reflected off mirror 8 and passes through eyepiece 10. This reflected portion 52, in the preferred embodiment, comprises mainly the light in the blue-green-yellow spectral range emanating from celestial body 16. Remainder 54 passes through mirror 8.

Also shown at FIG. 3 is the path of horizon image 4. As image 4 strikes mirror 8, part of the light energy passes through mirror 8, through eye piece 10, and to the user. Part is reflected from mirror 8. Transmitted part 56 is mainly that light energy in the orange, red, and violet spectral region in the preferred embodiment. As can be seen from FIG. 3, that transmitted is essentially that which is not reflected.

At FIG. 5 is illustrated a view 57 of horizon 6 and a number of celestial bodies 13 through the horizon mirror 8. FIG. 6 depicts a like view 58 using a standard, half-silvered horizon mirror. Such half-silvered mirrors have one half of their surface silvered for total reflection and one side clear for total transmission. FIGS. 5 and 6 show how celestial body image 12 and horizon image 4 are doubled in area and how the false horizon resulting from viewing through the trough of a long ocean wave is more easily seen with the present invention. It is also evident that picking up celestial objects within view 52 compared with like view 58, is much easier because of the double-size viewing area.

The present invention can also be practiced using a kit to modify a standard sextant having typically a standard, half-silvered mirror as the horizon mirror. The horizon mirror of a standard sextant is typically mounted to the body as is horizon mirror 8 of the preferred embodiment. Referring again to FIG. 2, horizon mirror 8 is mounted to a rectangular frame 59 which is attached to body 16 and defines a large rectangular void therein. Spring clips 60 secure horizon mirror 8 to frame 59. Adjustment screws 62 insure that horizon mirror 8 will be perpendicular to body 16. To modify a sextant such as that described above, one need simply loosen adjustment screws 62, lift up clips 60, and slip out the standard horizon mirror. Then one mounts image combining horizon mirror 8 within frame 58 and under clips 60 and screws 62. In some cases, a further inside cut out of frame 58 may be required. Specialized mounting hardware may be used, depending upon the exact configuration of the sextant to be modified. The size of the image combining horizon mirror 8 will generally be the same as the horizon mirror to be replaced. It may be desired to replace the prior art index mirror with a specially formulated dielectric mirror to increase reflective efficiency and eliminate salt water corrosion effects.

Using the improved sextant 2 with the spectral-selective horizon mirror proceeds essentially as using any other sextant. However the user obtains all the advantages arising from seeing celestial and horizon images 12, 4 doubled in area and superimposed. Essentially one first adjusts sextant 2 to insure the index and horizon mirrors 14, 8 are normal to the body plane. This is accomplished using adjustment screws on mirrors 14, 8. Details of how to accomplish his can be found in standard navigation reference books. Sextant 2 is then held by handle 20 and horizon 6 is viewed through eyepiece 10. One or mre index of horizon shades 22, 23 are used if necessary. Index arm is pivoted while facing the celestial body 13 whose altitude is to be measured. Pivoting is best accomplished by first using quick release lever 42 and then micrometer drum 40. Sextant 2 is rocked from side to side while using micrometer drum 40 to bring celestial body 13 to horizon 6. This procedure is much easier when using the improved sextant compared with prior art sextants. It is common to adjust the elevation of the sun until it just rests on the horizon and correcting for the angular distance of one half the sun's diameter. The reading is then taken from index scale 24. Whole degrees are read directly from scale 24 by using an index line 64. Line 64 is on index end 36 adjacent to aperture 38. Fractions of a degree are read using micrometer drum 40. Using the measurement taken to determine the user's location on the earth is well known to those skilled in the art.

Thus, although the best mode contemplated for carrying out the present invention has been herein shown and described, it will be apparent that modification and variation may be made without departing from what is regarded to be the subject of the invention.

I claim:

1. In a sextant for measurement of the angle between distant objects of the type wherein said sextant includes a first optical path means for receiving light from a first horizon object, a second optical path means from receiving light from a second celestial body object at a vertical angular distance from said first object, said first and second optical path means each including means for producing images of said respective objects and for measuring the angle therebetween, and means for registering the respective images of said objects to obtain accurate measurement of the angle between said objects, the improved registering means comprising:
  a spectrally selective beam combining mirror that is at least partially transmissive to enable light from said horizon object to combine with reflected light from said second celestial body object so that the joint output of said beam combining mirror is a superimposed image of said respective first and second objects covering the full field of view;
  said beam combining mirror having predominately reflective characteristics in the blue-green-yellow range corresponding to wavelengths from said second celestial body object, and predominately transmissive characteristics to visible light in all other ranges above and below the blue-green-yellow range from said first horizon object whereby there is produced an enhanced superimposed image of said first and second objects over the full field of view.

2. The invention of claim 1 wherein said mirror is transmissive in a first wavelength range approximately 6300 Å to 7500 Å, said mirror is reflective in a second wavelength range is approximately 4500 Å to 5900 Å and said mirror is transmissive in a third wavelength range is approximately 4000 Å to 4500 Å to provide an enhanced superimposed image of said first horizon object and said second celestial body object at dawn or dusk.

3. The invention of claim 1 and wherein said beam combining mirror being preferentially reflective to light in the blue-green-yellow range and being preferentially transmissive to light in all other ranges.

4. An optical instrument for measuring the vertical angular distance between the horizon and a celestial body comprising:
  a first optical path for viewing the horizon;
  a second optical path for viewing the celestial body;
  means for adjusting the angle between said optical paths to permit varying angularity between the horizon and the celestial body to be measured;
  means for producing an image from each optical path;
  a partially reflective and partially transmissive mirror for combining the respective images, said mirror occupying the full field of said first and second optical paths;
  said mirror being preferentially transmissive to light in the orange-red range from the horizon;
  said mirror being preferentially reflective to light in the blue-green-yellow range from the celestial body;
  said mirror being preferentially transmissive to light in the violet-blue range from the horizon so that a combined, superimposed image is produced thereby indicating the vertical angular separation between the horizon and celestial body.

5. The invention of claim 4 and wherein:
  said mirror is spectrally selective so that the majority of the light from the horizon in the 6300 Å to 7500 Å range is transmitted through the mirror, the majority of the light from the celestial body in the range of 4500 Å to 5900 Å is reflected off of the mirror and the majority of the light from the horizon in the 4000 Å to 4500 Å range is transmitted through the mirror thereby producing a superimposed, spectrally selected image.

6. The invention of claim 4 and wherein said mirror is a dielectric beamsplitter.

7. In a process for measuring the vertical difference between a celestial body and the horizon comprising the steps of:
  providing a sextant having first and second optical paths, said first optical path extending from said sextant to a celestial body having spectral emission in the range of 4500 Å to 5900 Å a second optical path to the horizon having spectral emission in the range of 6300 Å to 7500 Å;
  inserting in said sextant a partially reflective, partially transmissive mirror across the entire field of view of said sextant having a reflective surface addressed to the optical path from said celestical body with a preferential reflection in the range of 4500 Å to 5900 Å and having said mirror addressed to said horizon with preferential transmission in the range of 6300 Å to 7500 Å and 4000 Å to 4500 Å; and
  combining the respective images to produce an enhanced superimposed view of the celestial body and horizon images.

8. The process according to claim 7 wherein the step of inserting said mirror further comprises the step of inserting in said sextant a partially reflective, partially transmissive dielectric beamsplitter mirror.

* * * * *